(12) United States Patent
Ito

(10) Patent No.: US 8,497,883 B2
(45) Date of Patent: Jul. 30, 2013

(54) INFORMATION DISPLAY DEVICE

(75) Inventor: Masahiro Ito, Tokyo (JP)

(73) Assignee: Yappa Corporation, Tokyo (JP)

( * ) Notice: Subject to any disclaimer, the term of this patent is extended or adjusted under 35 U.S.C. 154(b) by 453 days.

(21) Appl. No.: 12/921,386

(22) PCT Filed: Jun. 10, 2010

(86) PCT No.: PCT/JP2010/059879
§ 371 (c)(1),
(2), (4) Date: Oct. 27, 2010

(87) PCT Pub. No.: WO2011/024535
PCT Pub. Date: Mar. 3, 2011

(65) Prior Publication Data
US 2011/0169860 A1    Jul. 14, 2011

(30) Foreign Application Priority Data

Aug. 28, 2009  (JP) ................................ 2009-198890

(51) Int. Cl.
*G09G 5/00*       (2006.01)
*G06T 17/00*      (2006.01)

(52) U.S. Cl.
USPC ........................................ 345/667; 345/428

(58) Field of Classification Search
USPC .......................................... 345/660–671, 428
See application file for complete search history.

(56) References Cited

U.S. PATENT DOCUMENTS

| 6,650,343 | B1 | 11/2003 | Fujita et al. | |
| 6,967,651 | B2 * | 11/2005 | Endoh et al. | 345/428 |
| 7,439,970 | B1 * | 10/2008 | Clarke | 345/419 |
| 2002/0000998 | A1 * | 1/2002 | Scott et al. | 345/667 |
| 2010/0123732 | A1 * | 5/2010 | Jenks et al. | 345/592 |

FOREIGN PATENT DOCUMENTS

| JP | 2000-172248 A | 6/2000 |
| JP | 2008-305375 A | 12/2008 |

\* cited by examiner

*Primary Examiner* — Ryan R Yang
(74) *Attorney, Agent, or Firm* — Robert Plotkin, P.C.

(57) ABSTRACT

To provide an information display device suitable for a portable terminal for displaying on a display screen images of actual printed pages. The information display device includes: storing means for storing various data and programs used to execute applications; controlling means for controlling program execution, data processing, and input/output devices; communication means for receiving image data and associated attribute data; inputting means for receiving event input generated by various operations; and displaying means for displaying the image data and attribute data on a display screen; wherein said information display device, when transmitting search data based on event input received by the inputting means, receiving XML data describing addresses and display positions of the corresponding image data and attribute data, and receiving and displaying the relevant image data and attribute data, the controlling means has prefetching means for storing image data associated with page changes from among the received image data constituting each page in a display region of the storing means based on a predetermined priority.

8 Claims, 14 Drawing Sheets

Fig.8
(a) 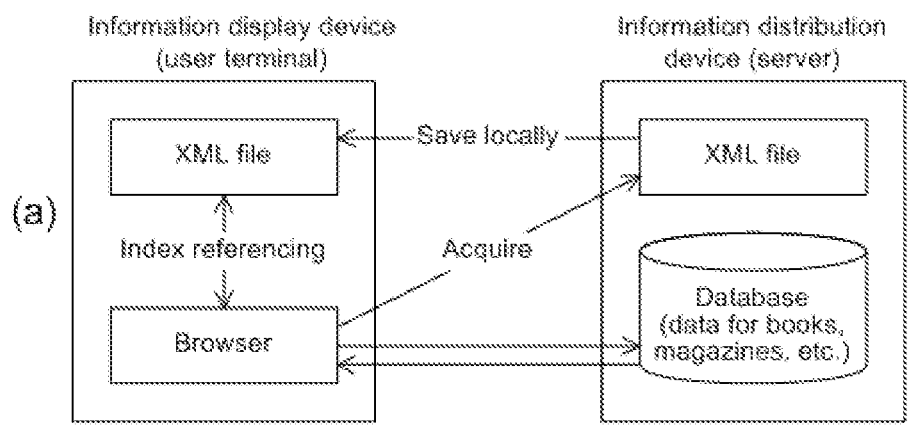
(b) 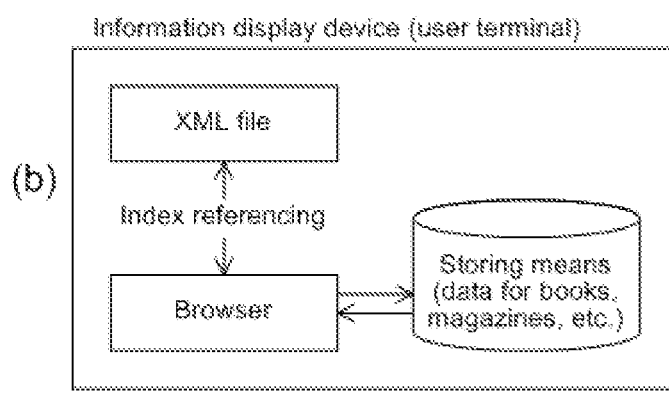

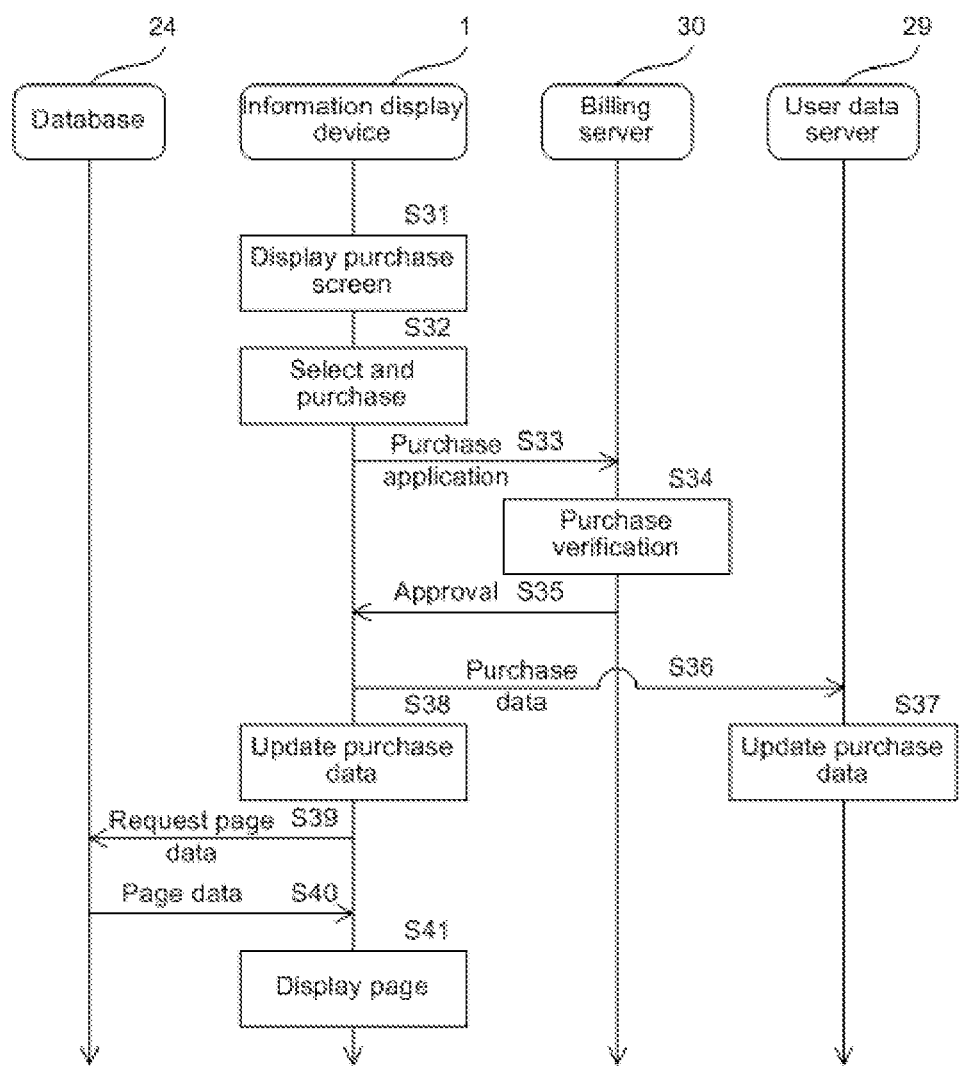

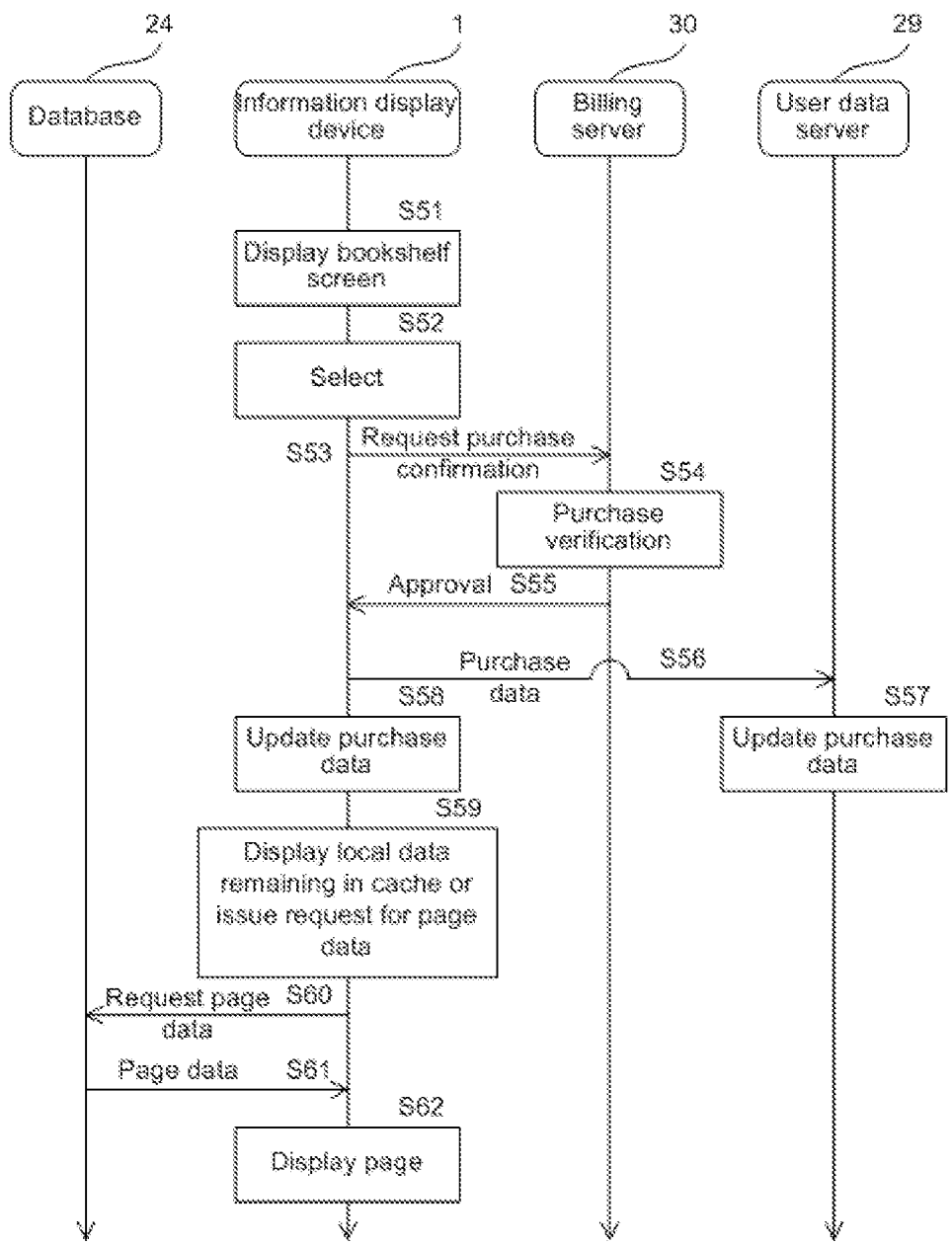

INFORMATION DISPLAY DEVICE

CROSS-REFERENCE TO RELATED APPLICATIONS

This application claims priority under 35 U.S.C. §365 from International Patent Application Serial Number PCT/JP2010/059879, filed on Jun. 10, 2010, entitled "Information Display Device"; which claims priority from Japanese Patent Application Serial Number JP2009-198890, filed on Aug. 28, 2009, entitled "Information Display Device."

TECHNICAL FIELD

The present invention relates to an information display device suitable for a portable terminal, and more specifically to an information display device that displays, on a display screen, publications such as newspapers, books, magazines, and advertisement leaflets as images of the actual pages.

BACKGROUND ART

The present applicant has disclosed in Patent Document 1 a publication issuance-and-distribution system and the like that (1) distributes newspapers over a communication network as electronic newspapers and (2) electronically displays on the display screen of a user terminal, such as a PC (personal computer), images of the printed newspaper pages. When displaying an electronic newspaper on a PC, the electronic newspaper can be distributed as Web pages, and the PC can employ a Web browser as the means for displaying the Web pages.

PRIOR-ART DOCUMENT

Patent Document
Patent Document 1: Japanese unexamined patent application Publication No. 2006-293939

SUMMARY OF THE INVENTION

Problems to be Solved by the Invention

However, a portable terminal such as a mobile telephone cannot provide a display area as large as that available on the display screen of a PC. Even a portable terminal known as a smartphone, which incorporates a portable telephone or other wireless communication means in a personal digital assistant (PDA), has a limited display area. Further, due to the limitations of the size, battery life, and the like of portable terminals, the processing capacity of the CPU and the like built into the portable terminal is also limited. Consideration must also be given to the limitations of wireless communications, applicable communication fees, available resources for network traffic, and other factors.

Therefore, one objective of the present invention is to provide an information display device that (1) is suitable for a portable terminal having low processing capacity, and (2) displays image data for a publication as images of the actual pages.

Means for Solving the Problems

This objective will be attained by the present invention's information display device for receiving image data of publications distributed by an information distribution device via a communication network and for displaying this image data as page images on a display screen.

Said information display device includes at least: (1) a storing means for storing various data and programs used to execute applications; (2) a controlling means for controlling (a) the execution of programs stored in the storing means, (b) data processes, and (c) input/output devices; (3) a communication means for receiving image data and associated attribute data via the communication network; (4) an inputting means for receiving event input generated by various operations on keys, a pointing device, or a touch panel; and (5) a displaying means for displaying the image data and attribute data on a display screen in response to operations received by the inputting means.

The image data comprises multiple sets of image data in a hierarchical structure having multiple hierarchical levels differing in image size and resolution. The storing means has image-processing means for selecting corresponding image data of a corresponding hierarchical level in response to operations for enlarging, reducing, or moving a display image received by the inputting means so as to display all or a portion of an image equivalent to a page image. The controlling means—when establishing an HTTP connection with an information distribution device via the communication means, transmitting search data based on event input received by the inputting means, receiving XML data describing addresses and display positions of the corresponding image data and attribute data, receiving the relevant image data and attribute data based on this XML data, and displaying the image data and attribute data on the display screen via the displaying means—has prefetching means for storing, in a display region of the storing means based on a predetermined priority image, data associated with page changes from among the received image data constituting each page of the image data to be displayed on the display screen. In the event of a user operation for changing to a page that does not conform to the predetermined priority before reading of the specified page has been completed, the controlling means first reads image data for the specified page and subsequently reads image data for other pages based on a predetermined priority that differs according to content.

Here, the multiple sets of image data for multiple hierarchical levels of differing image sizes and differing resolutions correspond to each of multiple pages in the publication, and the controlling means downloads, via the communication means, all of the multiple sets of image data for the multiple pages from the information distribution device.

When downloading the multiple sets of image data for the multiple hierarchical levels having different image sizes and different resolutions for multiple pages from the information distribution device, the communication means does not download image data of a hierarchical level having a high resolution when the reception speed for the image data is less than a prescribed value.

The displaying means has a single-page mode for displaying one page of image data on the display screen and a double-page mode for displaying two pages of image data on the display screen. When shifting from the single-page mode to the double-page mode, where the front cover is counted as page 1 and the currently displayed page is page X, the displaying means combines and displays on the left side the image data for page X, which was previously displayed in the single-page mode, and displays on the right side the image data for page X+1 when the image data is bound on the right side and X is odd or when the image data is bound on the left side and X is even. When the image data is bound on the right side and X is even, or when the image data is bound on the left side and X is odd, the displaying means combines and displays image data for page X, which was previously displayed in the single-page mode, on the right side, and displays image data for page X+1 on the left side.

The displaying means has a memo function for adding and displaying new image data or new text in combination with the image data constituting each page of image data to be displayed on the display screen and for saving this new image data or text in the storing means so that the data or text can be redisplayed.

The displaying means provides a separate information display window on the display screen that is used to display the image data, and displays separate and independent content transmitted from the information distribution device or another server in the information display window.

The separately provided information display window advances outward from one side of the display screen through animation, at which time the information displayed in the separately provided information display window is displayed as a semitransparent image that overlaps the displayed image corresponding to the image data.

Effects of the Invention

In order for the present invention's information display device to display image data of a publication as page images, instead of using the information distribution device to transmit publication pages' image data as Web pages, the information display device specifies the image data to be displayed as XML data and directly downloads the image data. Because the image data is displayed using a dedicated processing engine rather than a Web browser, this configuration conserves resources for communication traffic by not transmitting Web pages and reduces the process load on the information display device. This configuration, when applied to a portable terminal, can also reduce the time required to respond to user operations and to display images.

BRIEF DESCRIPTION OF THE DRAWINGS

In the drawings:

FIG. 8 illustrates the browsing method employed by the information display device and the information distribution device shown in FIG. 1, where (a) illustrates the online browsing method, and (b) illustrates the method of browsing locally saved images.

FIG. 13 illustrates the process for initial access between the information display device and the information distribution device.

FIG. 14 illustrates the process for a second or subsequent access between the information display device and the information distribution device.

MANNER OF IMPLEMENTING THE INVENTION

Next, while referring to the accompanying drawings, the preferred embodiment for implementing the information display device and information distribution device of the present invention will be described in detail, applying the information display device to a portable terminal (a portable information-display device).

Figure 1:
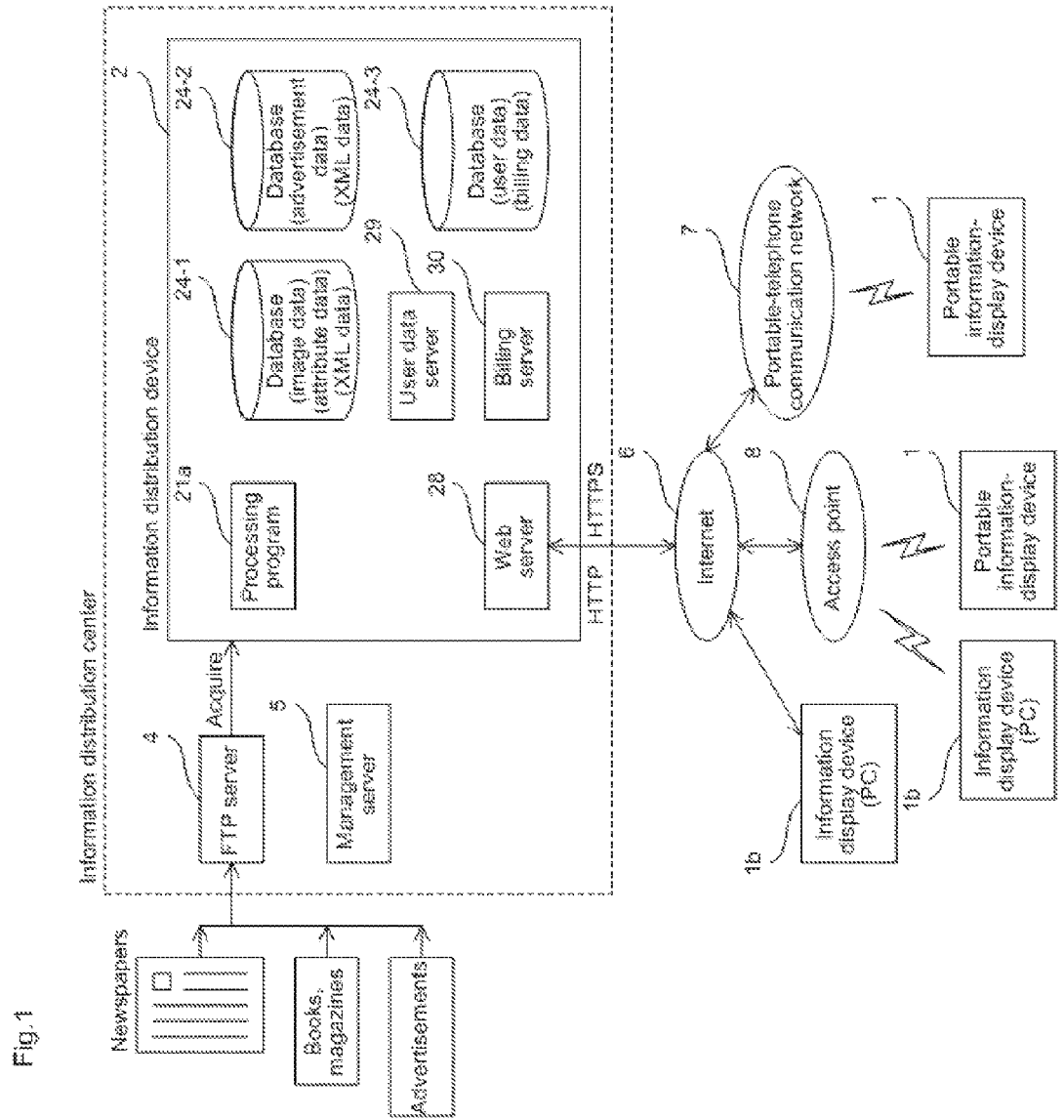
FIG. 1 shows the overall configuration of an information display device and an information distribution device according to the preferred embodiment of the present invention.

FIG. 1 is a block diagram showing the overall configuration of the information display device and information distribution device according to the preferred embodiment of the present invention. The following description will primarily cover a case in which the information distribution device distributes newspapers as the electronic publications.

Next, the information distribution center according to the preferred embodiment will be described. As shown in FIG. 1, an information distribution device 2 is provided in the information distribution center. The information distribution device 2 receives image data of the actual pages of newspapers, i.e., the original data for newspapers to be actually printed and distributed, via an FTP server 4, which also is provided in the information distribution center, from display terminals or the like (not shown) that are provided at the newspaper companies' head offices, regional offices, and the like, and that are used for editing. Said display terminals are connected to a dedicated communication network configured of a VPN (virtual private network) or the like that is applied to a communication network. A processing program 21a installed in the information distribution device 2 reads the image data of actual newspaper pages received via the FTP server 4 and generates compressed image data.

The processing program 21a of the information distribution device 2 (1) acquires image data for each page of the newspaper, together with associated attribute data, such as the issue date, page number, and section name; (2) generates multiple sets of image data encoded, by using JPEG (Joint Photographic Experts Group) compression or the like, as multiple hierarchical images for each page having different image sizes and resolutions; (3) assigns indexing data to each generated set of image data; and (4) saves the sets of image data in a database 24-1, together with the associated attribute data, relative coordinate data for display positions and display ranges relative to the overall page, and the like (image-data generating means 25 and attribute-data assigning means 26 shown in FIG. 2).

Figure 2:
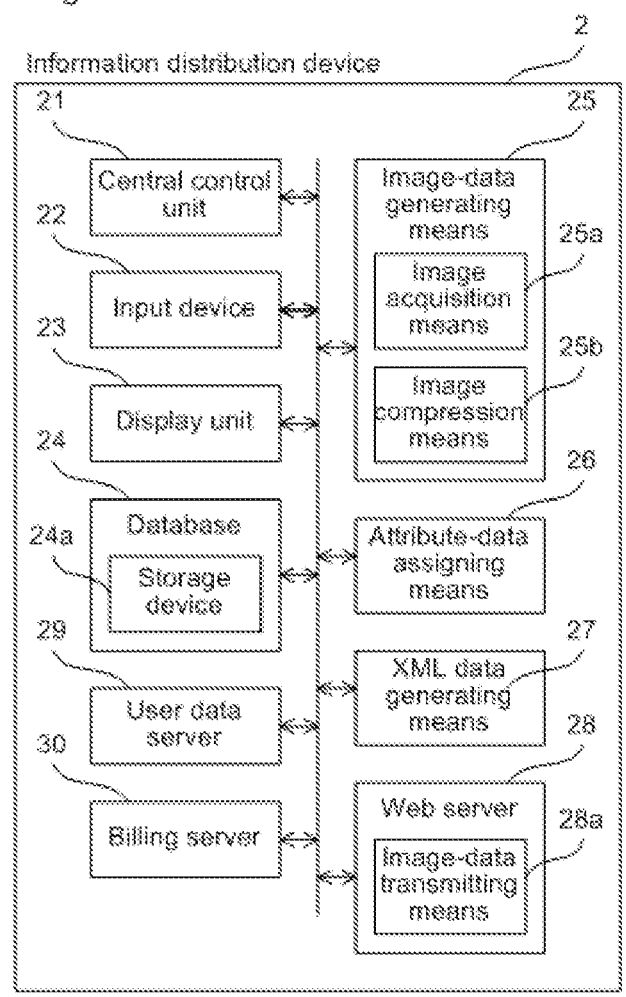
FIG. 2 shows the information distribution device of FIG. 1 according to the preferred embodiment.

The processing program 21a (1) reads the multiple sets of image data having multiple differing levels of image size and resolution for each page, and their attribute data from the database 24-1, (2) automatically generates XML (eXtensible Markup Language) data, and (3) temporarily saves this XML data in a database (XML-data generating means 27 shown in FIG. 2). The generated XML data describes addresses specifying the locations of the saved image data, relative coordinates determining the display positions of the image data, hierarchical level numbers, and the like, for displaying images equivalent to the actual pages and their associated attribute data on the display screen of a portable information-display device 1 or an information display device (PC) 1b implemented by application software installed on a normal PC (the portable information-display device 1 is the example used in the following description; hereinafter, the portable information-display device 1 will be simply referred to as the information display device 1).

The information distribution device 2 is provided with a Web server 28. In response to a request signal to display an electronic newspaper based on actual page images received from the information display device 1 via a communication network, such as a wireless-LAN access point 8 connected to an internet 6, or via a portable telephone communication network 7 connected to said internet 6, the Web server 28 transmits the image data and associated attribute data, as well as XML data providing information for displaying this image data and attribute data on the display screen of the information display device 1. The Web server 28 distributes the image data and XML data using HTPP (Hyper Text Transfer Protocol) or HTTPS (HTTP over Secure Socket Layer). The HTTP or HTTPS protocol is integrated in the Web server 28, and the Web server 28 is easily installed on a PC or other general-purpose computer.

Specifically, the information display device 1 transmits search data to the Web server 28. The Web server 28 reads corresponding XML data from the database 24-1 based on the search data received from the information display device 1 and transmits this XML data to the information display device 1. The information display device 1 processes the XML data and issues a request to the Web server 28 for image data of the corresponding page images and the associated attribute data. In response to this request, the Web server 28 reads the requested image data and associated attribute data from the database 24-1 and transmits this data to the information display device 1.

The information distribution center also distributes, in addition to newspapers, such content as books, magazines, and advertisement leaflets that are for sale as image data of the actual page images. A user-data server 29 functions to register user data and saves this user data in a database 24-3, together with information on the content distributed to each user. A billing server 30 guides the user through an online purchase procedure when distributing fee-based content to the user. The user-data server 29 backs up purchase data, including purchased content saved locally, on the information display device 1 and saves this purchase data for each user. A user can use a different terminal to display and browse purchased content that has been backed up on the user-data server 29, or can transfer the ability to display and browse purchased content to a new terminal when the number of terminals allowed for use is limited. This user data can be used in a marketing strategy for predicting the user's purchasing trends. The user-data server 29, billing server 30, and database 24-3 do not need to be provided in the information distribution center, but can be provided externally and accessed via a network connection.

In addition to the advertisements provided in leaflets, advertisements can be displayed in a separately provided information display window and superposed over page images of newspapers, books, magazines, and the like. These functions will be described later in greater detail. The information distribution center is also provided with a management server 5 for implementing incidental support functions other than the functions described above and monitoring, protecting, and maintaining data communication functions and the like. The FTP server 4, management server 5, and information distribution device 2 provided in the information distribution center can be configured with a workstation or a commercial PC. Not included in this specification and the accompanying drawings are details concerning: the CPU (central processing unit); memory modules, hard disks, and other storage devices; the display device for displaying images, text, and the like; input devices, such as a keyboard and mouse; an input/output device for interfacing with the communication network; and other elements constituting the workstation or PC. Further, databases having a storage device can be implemented using a separate computer.

FIG. 2 is a block diagram showing the information distribution device of FIG. 1 according to the preferred embodiment.

As shown in FIG. 2, the information distribution device 2 according to the preferred embodiment includes a central control unit 21 that includes: an MPU or the like; one or more input devices 22, such as a keyboard and/or mouse; a display unit 23, such as an LCD display; a storage device 24a that contains a database 24; and other input/output devices (not shown). Various functions in the preferred embodiment are implemented through software processes using relevant hardware by installing an application program on a PC or other computer system.

The image-data generating means 25 in the information distribution device 2 includes image acquisition means 25a for acquiring, via the FTP server 4, image data of actual pages in newspapers received from newspaper companies in various regions, together with associated attribute data, including the date of issue date, page number, and section name; and image compression means 25b for generating multiple sets of image data encoded, by using JPEG compression or the like, as multiple hierarchical images having differing image sizes and differing resolutions for each page. The image-data generating means 25 saves this generated image data together with the accompanying attribute data in the database 24 with assigned indexing data.

When the image-data generating means 25 generates multiple sets of image data for multiple levels with differing image sizes and differing resolutions, the attribute-data assigning means 26 assigns relative coordinate data for the display position and display range of the data sets relative to the overall page and additional attribute data relating to the level number and the like, and saves this data in the database 24. The attribute-data assigning means 26 can assign, as the attribute data, data and the like converted to text in an editing operation using OCR (optical character recognition).

When browsing and displaying content on the information display device 1 after the attribute-data assigning means 26 has assigned text data to the image data sets, the information display device 1 can be switched to a text display mode for displaying text only or to a caption display mode for displaying captions superimposed over the image data. Further, when the information display device 1 supports text data in multiple languages, the information display device 1 can display text data of a manga (comic book), magazine, or the like for browsing in the user's desired language without having to process the image data. Further, the text data can be used for searching, enabling the user to search not only the content displayed on the information display device 1, but also a variety of other content accumulated in the database 24.

The XML-data generating means 27 automatically generates XML data describing the addresses for reading image data saved in the database 24, the relative coordinates for determining the display positions of image data, the image sizes, the level numbers, and the like, and temporarily saves this XML data in a database in order that the Web server 28, in response to operations on the information display device 1, can read an image corresponding to an actual page and its associated attribute data to be displayed on the display screen of the information display device 1, based on indexing data for the multiple sets of image data having multiple levels with differing image sizes and differing resolutions for each page and their attribute data saved in the database 24.

In response to a request signal transmitted from the information display device 1 according to HTTP or HTTPS via a communication network, such as a wireless LAN access point 8 connected to an internet 6 or a portable telephone communication network 7 connected to an internet 6, the Web server 28 reads XML data describing information for displaying the corresponding image data and associated attribute data from the database 24 based on search data received from the information display device 1 and transmits this XML data to the information display device 1. Next, the information display device 1 processes the XML data received from the Web server 28 and requests the corresponding image data and associated attribute data. In response to this request, the Web server 28 reads the corresponding image data and associated attribute data from the database 24 and transmits this data to the information display device 1. The Web server 28 has image-data transmitting means 28a for transmitting the XML data, image data, and attribute data acquired by the Web server. The user-data server 29 functions to register user data and to save purchase data for each user. The billing server 30 guides the user through a purchasing procedure when fee-based content is being distributed according to the process described above.

Figure 3:
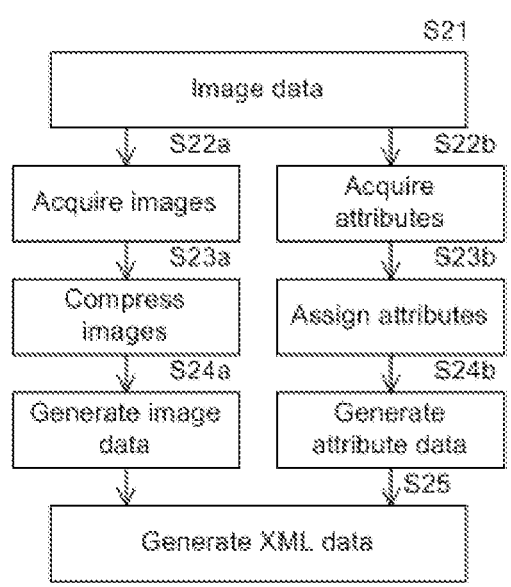
FIG. 3 is a flowchart of a process executed by the information distribution device to acquire image data.

Next, the process executed by the information distribution device 2 to acquire image data will be described with reference to the flowchart of FIG. 3.

The information distribution device 2 receives image data from display terminals used for editing and the like at newspaper companies via a communication network and the FTP server 4 for pages of newspapers that will actually be printed and distributed, and extracts image data for each page according to the processing program installed on the information distribution device 2 (step S21). Since the extracted image data is configured of images for the actual pages and associated attribute data, the information distribution device 2 extracts both the images and associated attribute data (steps S22a and S22b).

The information distribution device 2 sequentially converts each image of each page into compressed data by sequentially reading pixels of prescribed regions (step S23a) and subsequently generates image data and saves this image data in the database 24 (step S24a). At this time, image data is generated as multiple hierarchical images, wherein the hierarchical images at each level have a different image size relative to the overall page and a different compression ratio (resolution), as will be described later with reference to FIG. 4. The hierarchical images are generated according to parallel processing or sequential processing based on the processing capacity of the information distribution device 2.

The image data acquired in step S21 includes such attribute data as the date of issue, page numbers, and section names. The information distribution device 2 extracts this attribute data associated with each image (step S22b). The attribute data associated with each image is acquired by either extracting data embedded in the image data for the page images or by performing an OCR process on a predetermined region of the image that includes the date of issue, page number, section name, and the like, so as to convert this image to text data.

Further, when generating multiple sets of image data for multiple levels with differing image sizes and differing resolutions, the information distribution device 2 automatically assigns to each set of image data relative coordinates defining the display position of the generated image data relative to the overall page, as well as the display size, a level number, and the like, and assigns other attributes through an editing operation when necessary (step S23b). Next, the information distribution device 2 generates attribute data and saves the attribute data in the database in association with the corresponding image data (step S24b). When assigning attributes, the information distribution device 2 can convert content in the entire region of the page into text through OCR processing and can also assign separately prepared text data in multiple languages or the like.

Indexing information for the image data generated in step S24a and the attribute data generated in step S24b is simultaneously saved in the database 24. Next, the information distribution device 2 automatically generates XML data that describes addresses specifying saved image data, relative coordinates determining display positions of the image data, display sizes, hierarchical level numbers, and the like, and saves this XML data in a database so that a desired image can be displayed on the display screen of the information display device 1 in response to a user operation by reading the corresponding image data and attribute data based on indexing information (step S25).

The XML data can be automatically generated according to CGI (common gateway interface) or the like using Perl script, for example, written for a specific information display device 1. Rather than using pre-generated indexing data, an SQL query can be used as the method of searching the database to extract data therefrom. However, the method in the preferred embodiment for generating an XML document conforming to CGI or the like using a script such as Perl makes searching the database easier than by using a process involving SQL queries, with the advantage of using a storage device built into a commercial PC rather than a full-fledged external database, simply by installing an application program on the PC. Further, by using the header data in the HTTP request, the information distribution device 2 can identify the model of the information display device 1 and the like and can modify the script description and the like to support multiple types of information display devices 1.

Figure 4:
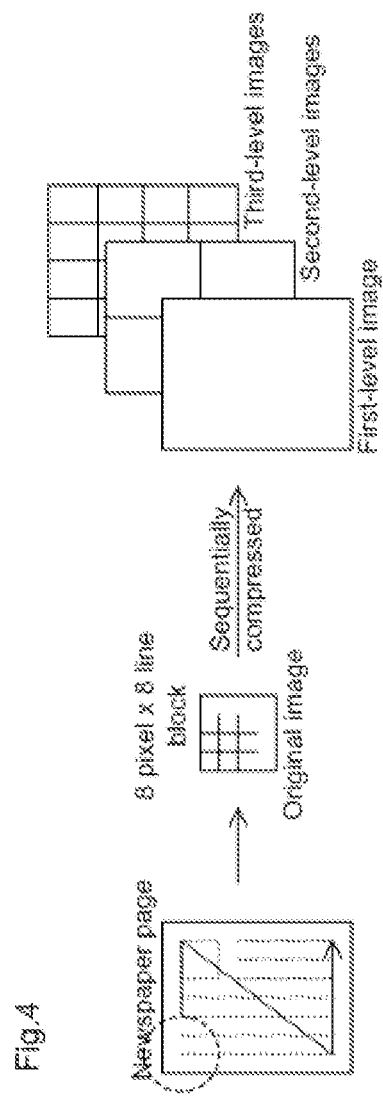
FIG. 4 illustrates the process of generating multilevel image data by reading and sequentially compressing image data.

FIG. 4 illustrates the process of generating multilevel image data by reading and sequentially compressing the image data.

Images displayed on display terminals used for editing at newspaper companies can be in such image formats as BMP, PDF (Portable Document Format), JBIG (Joint Bi-level Image Experts Group), and JPEG. The image data in these formats, which were compressed when acquired by the information distribution device 2, are decoded—although BMP data is left unchanged—and temporarily stored in a memory area.

Pixel data in a prescribed region of the newspaper image stored in a memory area, i.e., the unit block of 8 pixels×8 lines in FIG. 4, are sequentially subjected to two-dimensional DCT (discrete cosine transform), the transform coefficients generated by DCT are quantized to render a finite number of discrete values, and the quantized coefficients are entropy-coded using the Huffman code or the like in order to generate a single compressed set of image data.

The generated image data has a hierarchical structure. FIG. 4 shows the process when three hierarchical images are generated. The entire newspaper page is configured of a single set of image data at the first level; four sets of image data at the second level, produced by dividing the overall image into four sections; and sixteen sets of image data at the third level, produced by dividing the overall image into sixteen sections. The size of the image relative to the overall page based on the sets of image data differs for each level, but it is desirable that each set of image data have the same number of pixels as the display screen on the information display device 1. Hence, the sets of image data at different levels have different resolutions and different compression ratios relative to the overall page. Images at the first level are reduced to fit the display screen of the information display device 1, while images at the third level are enlarged. The number of hierarchical levels is not limited to three, but can be two or four or more.

Figure 5:
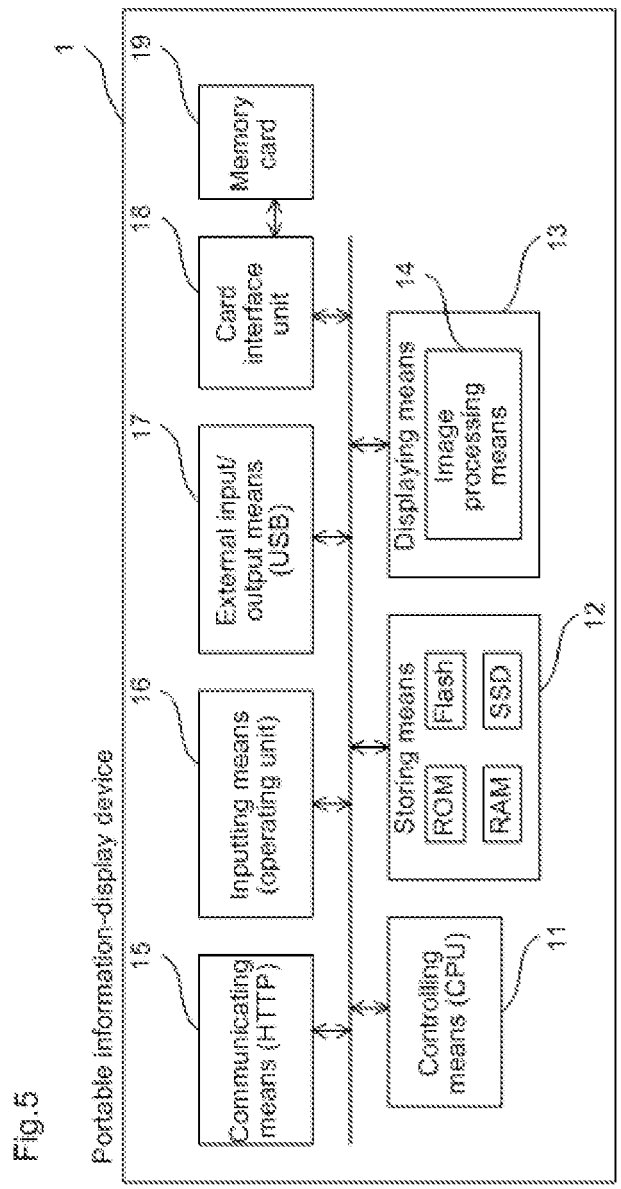
FIG. 5 shows the portable information-display device of FIG. 1 according to the preferred embodiment.
Figure 6:
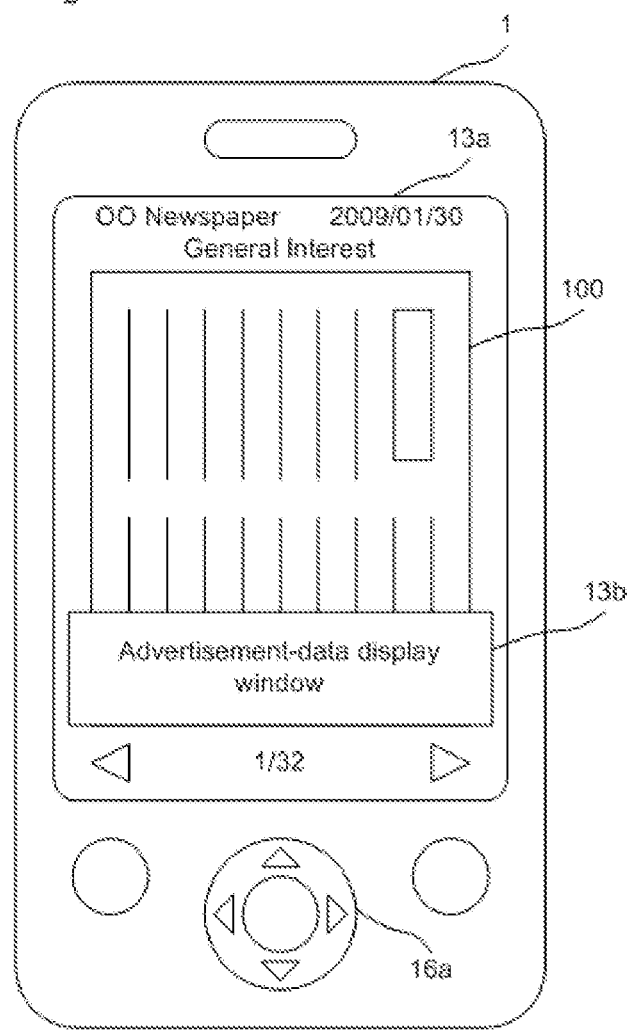
FIG. 6 is an exterior view of the preferred embodiment of the portable information-display device.

Next, the information display device 1 will be described with reference to FIGS. 5 and 6. FIG. 5 is a block diagram showing the portable information-display device of FIG. 1 according to the preferred embodiment. FIG. 6 is an exterior view of the portable information-display device according to the preferred embodiment.

As shown in FIG. 5, the information display device 1 according to the preferred embodiment includes inputting means (an operating unit) 16 for inputting various operations, and displaying means 13 for displaying images of actual pages on an LCD (liquid crystal display) screen or the like in response to operations on the inputting means 16. The communication means 15 of the information display device 1 receives—via the portable telephone communication network 7 or the wireless LAN access point 8 from the information distribution device 2 connected to the internet 6—image data and the corresponding attribute data for displaying images of actual pages, and stores this data in the RAM (random access memory), flash memory, SSD (solid state drive), or the like of a storing means 12. User input operations on the inputting means 16 are transferred via the inputting means 16 to a controlling means (a CPU; central processing unit) 11 to then be processed. The image processing means 14 displays images of actual pages via the displaying means 13 based on commands from the controlling means 11.

To display images of newspaper pages, the information display device 1 receives digital image data that has been compressed (encoded) by using JPEG or another method. The image processing means 14 of the information display device 1 performs a decoding process on the image data to develop the data in the RAM of the storing means 12 for displaying on the LCD screen or the like of the displaying means 13, and displays the image on the display screen in response to a user operation.

The image processing means 14 has a decoder (process for decoding compressed data) configured in a hardware or software engine. The image processing means 14 performs a process to decode compressed digital-image data into a form that can be displayed on a display screen and—in response to event input generated by the inputting means 16 when the user specifies a reduction, enlargement, or movement operation—transfers all or part of the image data corresponding to the reduction, enlargement, and movement operations from the RAM of the storing means 12 to display memory included in the displaying means 13 to be displayed on the displaying means 13. Here, the displaying means 13 need not be provided with display memory. In such a case, a specific region in the RAM of the storing means 12 can be used as a window of the display memory to reduce any data-transfer time lag and the like.

The controlling means 11 functions as various means for controlling each of the above processes by executing programs stored in the ROM (read-only memory), the flash memory, or the SSD of the storing means 12. The details and description of hardware provided in an external input/output means 17 of the information display device 1 are not included herein.

The functions of the external input/output means 17 include outputting data to a printer connected externally via a USB (universal serial bus) and charging a secondary battery (not shown) built into the information display device 1, performing both functions via a USB terminal The information display device 1 can also receive programs or image data via the external input/output means 17 for displaying images of newspaper pages.

A card interface unit 18 serves to save image data and the like displayed by the information display device 1 in a memory card 19 and to read saved image data and the like from the memory card 19 to the information display device 1. The information display device 1 can also receive programs via the card interface unit 18 for displaying images of actual pages saved in the memory card 19.

Although not shown in the drawings, the communication means 15 has built-in communication functions for a mobile telephone and wireless LAN, and also includes both a short-distance wireless communication function conforming to IEEE 802.15.1 or the like and an infrared communication function for wirelessly connecting to a printer or other external device.

The information display device 1 shown in FIG. 6 is the preferred embodiment applied to a smartphone-type portable terminal device that includes a display screen 13a having an LCD or the like for displaying images, and multiple operating buttons 16a. The operating buttons 16a are primarily Up, Down, Left, and Right buttons and a center Accept button arranged in a plus-sign configuration for performing operations on an image of an actual page displayed on the display screen 13a, such as selecting a page, moving the position of the image display, and enlarging or reducing the image on the display screen. These operations can also be performed by touching a touch screen configured of a touch panel formed over the display screen, instead of using the operating buttons 16a.

A program for connecting to the information distribution device 2 and displaying a newspaper on the information display device 1 as images of the actual pages is downloaded and installed on the information display device 1 in advance. Although not shown in the drawings, the user of the information display device 1 on which this program is installed performs an operation to select a desired newspaper by specifying a date or the like in a menu, after which the information display device 1 transmits search data for the selected newspaper to the information distribution device 2. Upon receiving this request from the information display device 1, the information distribution device 2 reads corresponding XML data based on the received search data from the database 24 and transmits this XML data to the information display device 1. The information display device 1 processes the XML data and issues a request for the image data of the corresponding newspaper pages and the associated attribute data. In response to this request, the information distribution device 2 reads the image data and associated attribute data from the database 24 and transmits this data to the information display device 1.

Although not shown in the drawings, during the process of downloading the image data for actual pages and the associated attribute data, the information display device 1 displays each of the pages of the newspaper (nine pages, for example) as a list of thumbnail images on the display screen 13a of the information display device 1. When the user selects one page from among these thumbnail images, the information display device 1 displays a page image 100 on the display screen 13a identical to the newspaper page that is actually distributed, as shown in FIG. 6. The information display device 1 also displays at the top of the display screen 13a the name of the newspaper ("OO Newspaper" in this example), the date of issue ("2009/01/30" in this example), and the section name that is displayed on the page ("General Interest" in this example). At the bottom of the display screen 13a, the information display device 1 displays arrow icons for selecting other pages; the numbers "1/32" in this example indicate the number of the displayed page and the total number of pages in the newspaper. The advertisement-data display window 13b will be described later.

Multiple sets of image data having multiple levels are prepared for each page of a newspaper. When the user operates the operating buttons 16a to advance to the next page of the newspaper or to move, reduce, or enlarge the page, the inputting means 16 generates event input. Based on the event input generated, the image processing means 14 selects and develops all or part of the image data of the corresponding level based on the reduction, enlargement, or movement operation and develops the image data in the display memory to be displayed on the display screen 13a.

Rather than receiving image data for a corresponding page division each time that image data of a hierarchical level corresponding to an enlargement or reduction operation is displayed, the information display device 1 improves the response time to user operations by prefetching, into a prescribed region of RAM, image data for the next page divisions to be displayed, based on the display region and the enlargement or reduction ratio. This prefetch operation will be described later. Further, the enlargement and reduction operations are performed within a single set of image data through interpolation or pixel skipping. If the ratio for interpolation or pixel skipping exceeds a prescribed critical value, the information display device 1 selects image data at another level. This critical value has hysteresis and differs between a transition from enlargement to reduction and a transition from reduction to enlargement.

Figure 7:
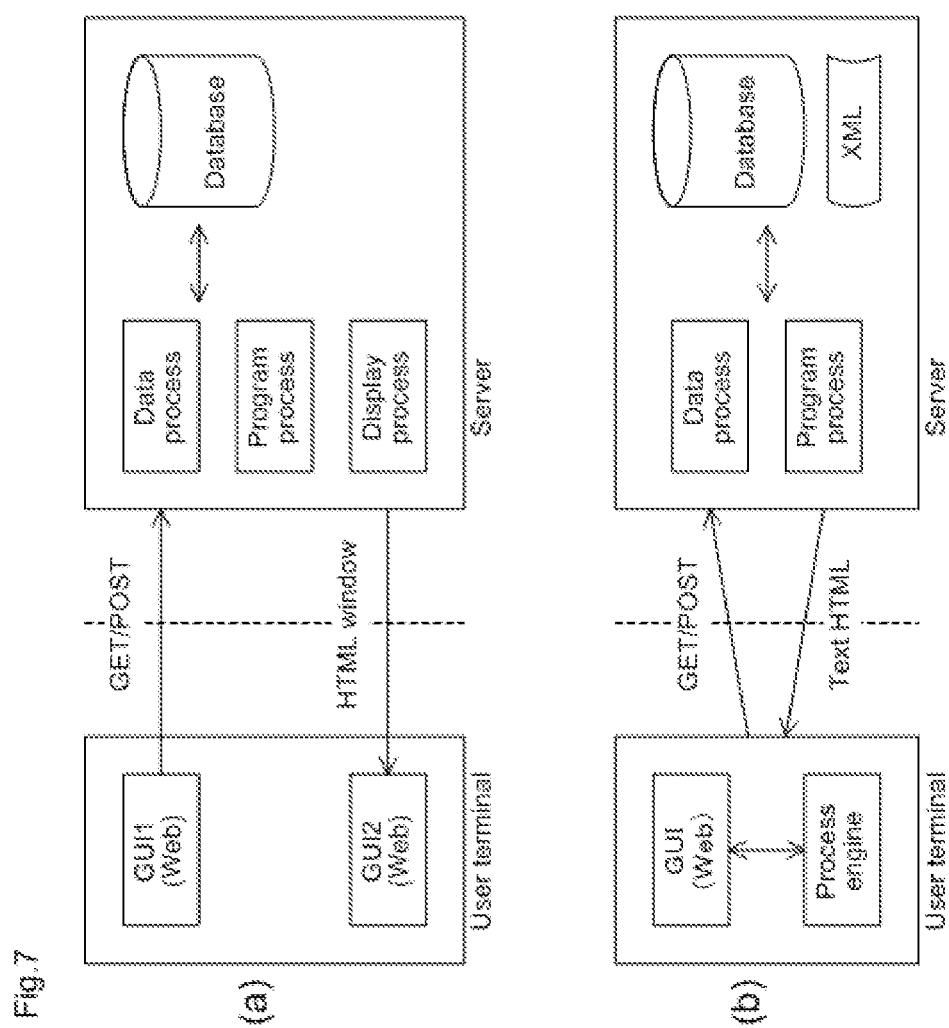
FIG. 7 illustrates image data distributed from a server and displayed as a Web page, where (a) shows the configuration for displaying a common conventional Web page, and (b) shows the configuration for displaying a Web page that applies Ajax.

Next, the process of distributing image data from a normally operating server and displaying the image data as a Web page in a Web browser installed on a PC or other user terminal will be described, with reference to FIG. 7, which illustrates image data distributed from a server and displayed as a Web page, where (a) shows the configuration for displaying a common conventional Web page and (b) shows the configuration for displaying a Web page that applies Ajax.

In the common conventional configuration shown in FIG. 7(a) for displaying Web pages in a Web browser on the user's terminal, a server transmits an HTML window (Web page) to be displayed in a Web browser, and the user's terminal displays this data in the Web browser. By clicking on a transmission button and the like, the user can transfer data through GET or POST commands from the user's terminal to the server. Based on this transferred data, the server accesses the database using SQL or the like, generates the new required HTML window by executing a CGI program or the like written in Perl script, for example, and again transmits this HTML window (Web page) to the user terminal to be displayed.

However, the use of Ajax (Asynchronous JavaScript and XML) illustrated in FIG. 7(b) has gained popularity in recent years. Ajax provides user interaction with events and dynamically displayed images through a DOM (Document Object Model), which has an API to allow applications to access the XML and HTML documents. Thus, while conventional Web applications transmit a request to the server when the user operates a transmission button or the like, Ajax communicates with the server and enables various events to trigger the transmission of data.

That is, as shown in FIG. 7(b), the server does not transmit an HTML window associated with a screen transition while the user terminal is transmitting a request in Ajax, but a script processing engine or the like incorporated in the Web browser of the user terminal references the text XML data to execute a process required for dynamically modifying a portion of the window content to display the received data. The conventional DHTML (Dynamic HTML) has similar functions for changing a Web page without reloading the page.

The distribution of image data by the information distribution device 2 described above and the display of image data on the information display device 1 can be understood through a comparison of these processes performed using Ajax. A dedicated process engine shown in FIG. 12 and described later is installed on the information display device 1 of the present invention. This process engine references the initially received XML data and selects appropriate image data to download from the information distribution device 2 based on event input accompanying user operations. The process engine issues a request to the information distribution device 2 for image data of a required level and for a required page to be displayed on the display screen of the information display device 1 from among the multiple sets of image data at multiple levels for all of the multiple pages, and subsequently receives this image data.

However, rather than requesting and receiving suitable image data for changing the display screen, the information display device 1 can be configured to download in advance all of the multiple sets of image data at the multiple levels for the multiple pages for drawing images on the display screen. At this time, the communication means 15 monitors the speed at which the image data is downloaded. If the reception speed is less than a prescribed value, the communication means 15 halts the downloading process after having received images for the first and second hierarchical levels, for example. Instead of receiving images at the third level, the communication means 15 handles operations to further enlarge images on the display screen by enlarging the display screen through interpolation of the displayed data.

Next, the method of browsing image data according to the present invention will be described, with reference to FIG. 8, which illustrates the browsing method employed by the information display device 1 and information distribution device 2 shown in FIG. 1, where (a) illustrates an online browsing method, and (b) illustrates a method of browsing locally saved images.

As shown in FIG. 8, the information distribution device 2 (server) of the present invention does not require a special software program, but stores on the information display device 1 (user terminal) as an index format in an XML file all data—including the storage locations of files, resolution data, page data, and layout data—necessary for displaying and browsing files. After acquiring this XML data, the information display device 1 can independently acquire and browse images as needed by referencing the index in the XML data and directly accessing the database 24 in which the book data is saved. The present invention thus obtains various advantageous features and effects, such as: not requiring special distribution software to be installed on the server side; reducing the distribution load on the server side when, for example, there is an increase in the number of clients (user terminals); simplifying the structure for distributing the processing load among servers, mirroring, and the like; and enabling the client to display and browse content independently, i.e., without a network connection, by locally saving (caching) content data for newspapers, books, magazines, and the like in storing means on the client side.

Figure 9:
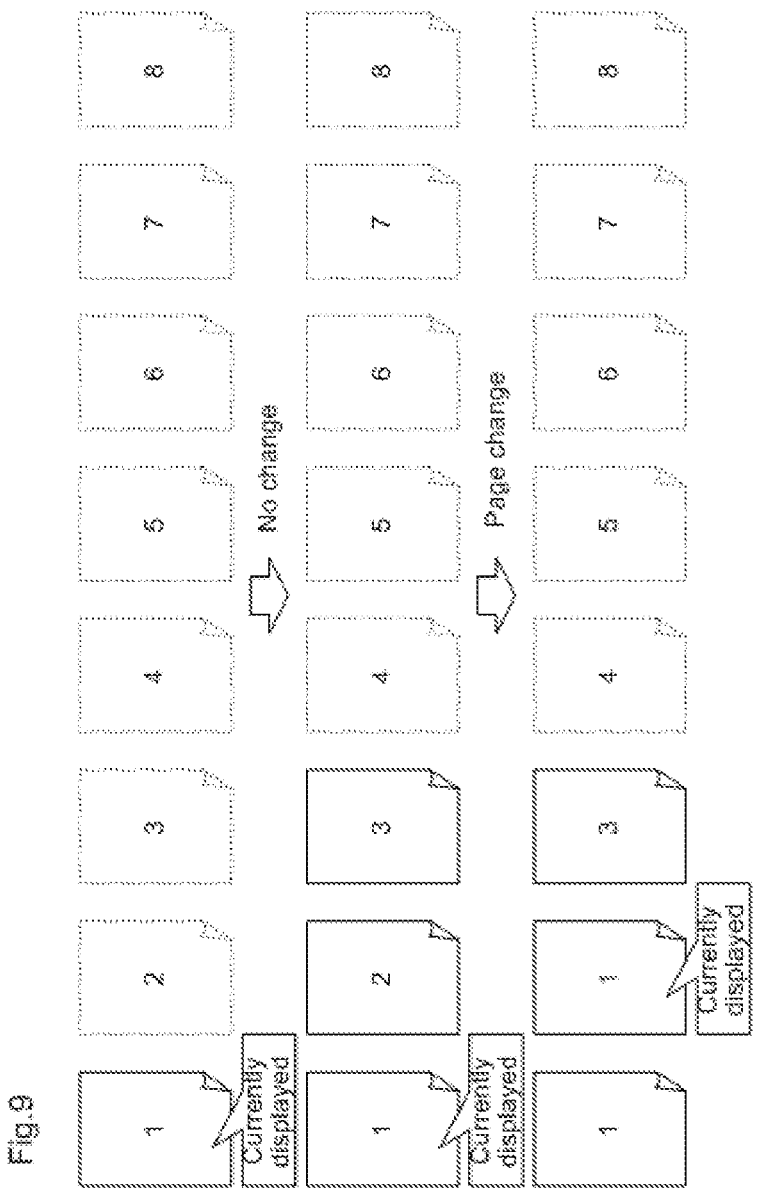
FIG. 9 illustrates operations to change and prefetch pages while image data is displayed.
Figure 10:
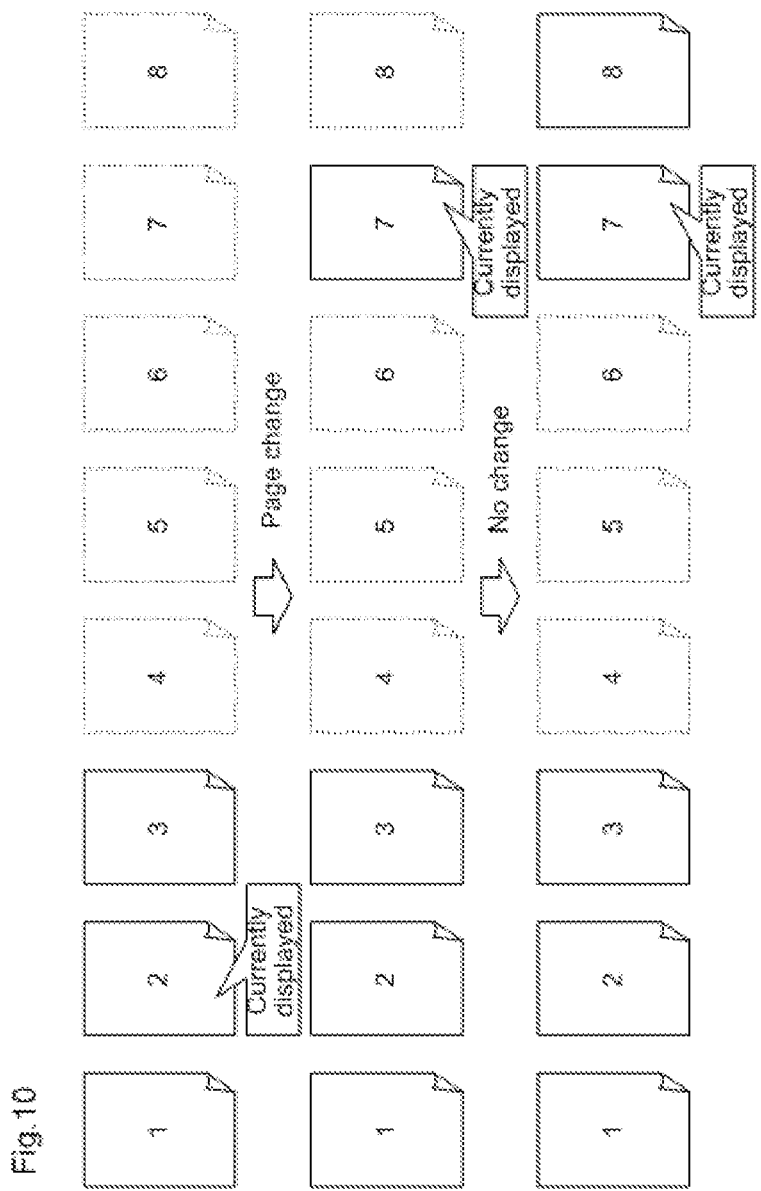
FIG. 10 illustrates priority in the prefetch operation while advancing through pages.

Next, operations for changing the displayed pages and for prefetching pages will be described for an example in which image data corresponding to a single page is displayed on the information display device 1. FIG. 9 illustrates the operations to change and prefetch pages while image data is displayed. FIG. 10 illustrates priority in the prefetch operation while advancing through pages.

When images are first displayed on the display screen by a conventional method not employing a prefetch operation, it takes a considerable amount of time from the moment a page is advanced until the page is displayed, making it difficult to quickly read the next page to display. In the preferred embodiment, the information display device 1 prefetches page data as a background process, even when an operation to advance to the next page is not performed, anticipating the next pages that the user will read based on a predetermined priority for pages of all content. This allows pages to be displayed with a faster response time when the transfer rate on the network is unreliable.

Because it is also conceivable that a user will perform operations that do not follow the preset priority, the priority of prefetch operations during a page advance will be described, with reference to FIG. 10. If the user advances to a page that has not yet been read, the information display device 1 first reads that page and subsequently begins reading pages anticipated to be the next that the user will read according to the preset priority. The pages predicted to be the next that the user will read differ according to the browsed content. In the case of a newspaper, for example, the information display device 1 does not simply give priority to the next page, but increases the priority of the final page that includes the TV schedule.

There are several possible variations to the order in which pages are read. One of the following variations can be used: (1) read unread pages in order following the currently displayed page and, after reading the last page, read unread pages in order from the first page; (2) read unread pages in order following the currently displayed page and, after reading the last page, read unread pages in reverse order beginning from the page before the currently displayed page; (3) read unread pages in order from pages nearest the currently displayed page to pages farther away; (4) preassign desired priority values to each page and, after reading the currently displayed page, read the remaining unread pages according to their priority values; and (5) a combination of the above. The information display device 1 can also be configured to learn priority information by accumulating the user's operation history.

Figure 11:
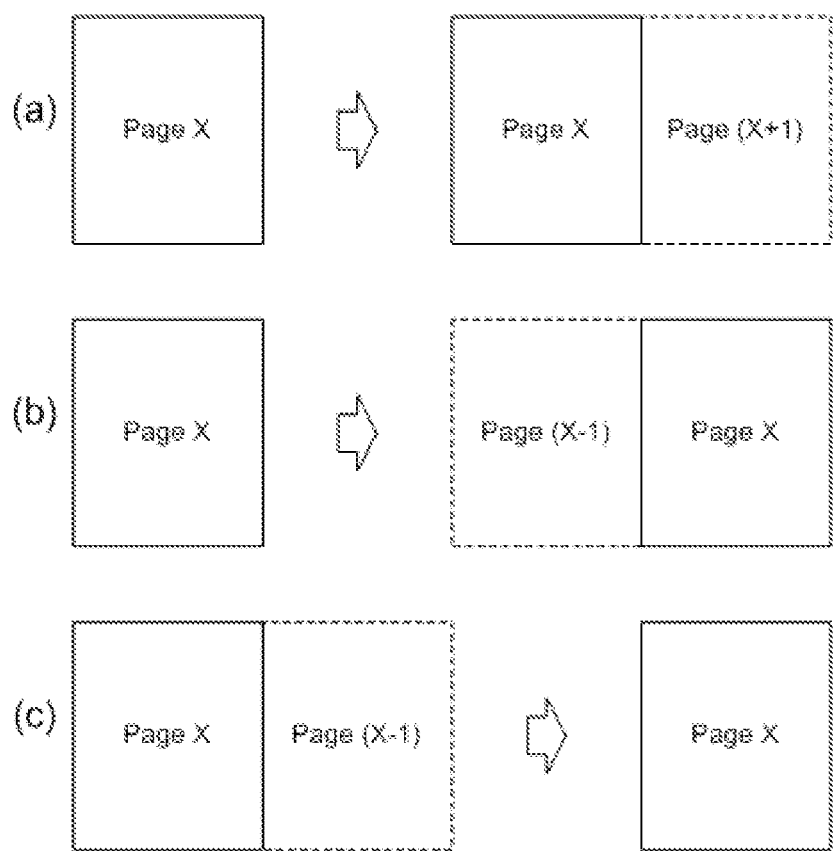
FIG. 11 illustrates image data displayed in a double-page mode.

Next, the pages of a screen displayed on the information display device 1 will be described, with reference to FIG. 11, which illustrates image data displayed in a double-page mode.

Thus far, the display of image data has been described assuming a single-page mode in which one page is displayed in the window, but image data can also be displayed in a double-page mode in which two pages are displayed in the window display screen 13a of the preferred embodiment's information display device 1. In the double-page mode, the information display device 1 shown in FIG. 6 can be rotated 90 degrees so that the long dimension of the display screen 13a is horizontal. In this case, a built-in accelerometer or the like can be used to detect the orientation of the information display device 1 and to automatically shift to the double-page mode. Alternatively, the user can perform an operation on a button, switch, or the like to switch the display mode on the display screen 13a to the double-page mode in which the long dimension of the display screen 13a is horizontal.

Pages of electronic publications based on the actual page images of newspapers, books, magazines, and the like are presented on either the right or the left, according to how they are printed in the original publication. In FIG. 11 the currently displayed page is considered page X, with the front cover being page 1. FIG. 11(a) shows an example in which the publication is right-printed and X is odd, or the publication is left-printed and X is even, and in the double-page mode image data is displayed so that page X, previously displayed in the single-page mode, is positioned on the left side and page (X+1) is displayed on the right side. FIG. 11(b) shows an example in which the publication is right-printed and X is even, or the publication is left-printed and X is odd, and in the double-page mode image data is displayed so that page X, previously displayed in the single-page mode, is positioned on the right side and page (X−1) is displayed on the left side.

Conversely, FIG. 11(c) shows an example of shifting from the double-page mode to the single-page mode. In this example, the page on the left side in the double-page mode is displayed when shifting to the single-page mode, regardless of whether the publication is right-printed or left-printed. However, the information display device 1 can determine in various ways the page to be displayed. For example, the information display device 1 can determine which page to display based on whether the publication is right-printed or left-printed, and it can detect the percentages of the left and right pages that are displayed in the double-page mode and can, for example, display in the single-page mode the page having the highest display percentage.

The information display device 1 has other useful functions for displaying content, a few of which will be described here. The Bookmark function is used to extract multiple desired pages or portions thereof displayed from a book, magazine, or other electronic publication, and to save data for these locations in the storing means 12. The Memo function is used to add, as a memo, text or image data to a displayed page, and enables the user to display the memo by itself or superposed over the page. If the display screen 13a has a Touch Panel function, the user can draw an image on the image data by tracing a finger over the page displayed on the display screen 13a. This function has such uses as drawing lines for marking passages or editing with a colored pen. The image data created with the Touch Panel function is saved in the storing means 12, and hence it can be redisplayed. Alternatively, the data can be saved in the database 24 of the information distribution device 2 and accessed exclusively by an individual user or shared with associates. Further, by providing the information display device 1 with a multi-axis accelerometer, an angular velocity sensor, a gyroscope, a geomagnetic sensor, or the like, the information display device 1 can detect its own inclination and the like, which can be useful for user operations and for displaying images. Tilt-detecting means can also be implemented by comparing discrepancies among the frames of a video captured by a camera, for example.

Figure 12:
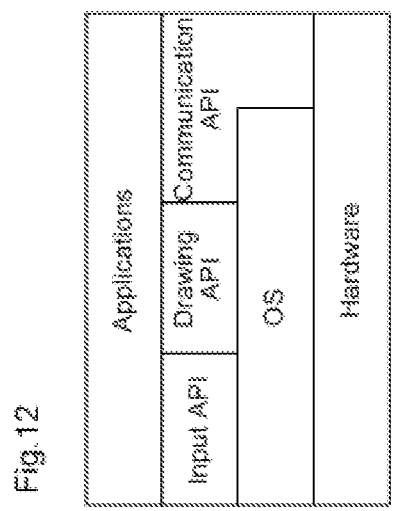
FIG. 12 shows an example of a process engine in a portable information-display device.

FIG. 12 shows an example of the process engine in the information display device. As shown in FIG. 12, an OS (operating system) read and executed by the controlling means 11 runs programs stored in the ROM, flash memory, or SSD of the storing means 12 over the hardware platform of the information display device 1, including the controlling means 11, storing means 12, displaying means 13, communication means 15, and inputting means 16 shown in FIG. 5. The information display device 1 runs applications through various API (Application Program Interfaces) implemented by the OS.

An application serving as a dedicated process engine for displaying an electronic newspaper as page images on the display screen of the information display device 1 is downloaded in advance from an information distribution device 2 or the like, and is installed on the information display device 1. Because most portable terminals of recent years have a Web browser installed thereon, the API of the browser can be used as the process engine. In the preferred embodiment, the dedicated process engine displays electronic newspapers on the display screen as page images, giving consideration for the response time required to draw images on the display screen and to respond to input events.

The image processing means 14 acquires an input event triggered by a user operation via an input API and, through a drawing API, selects appropriate image data of the corresponding level for the corresponding page based on the event input, and performs interpolation or thinning of pixels in the display image based on the required enlarging or reducing operation before the displaying means 13 displays the image. In order to improve processing speed, the communication API includes an HTTP process, part of which involves direct control of hardware without going through the OS.

Returning to FIGS. 1, 2, and 6, the display screen 13a of the information display device 1 is provided with an information display window for displaying separate information independent of the image data for a newspaper or other publication. An advertisement is an example of separate, independent information that can be used in the preferred embodiment.

A database 24-2 for saving advertisement data and its XML data is provided in the information distribution device 2 of the information distribution center, as shown in FIG. 1, or separately. Alternatively, the database 24-2 can be provided separately from the information distribution center itself as an advertisement distribution server. The database 24-2 can save—separately from the image data for a newspaper or other publication—images, text, or sound data for displaying advertisements in the information display window provided on the display screen of the information display device 1. The XML-data generating means 27 generates XML data that describe the address and display position for displaying the advertisement data and saves the XML data in the database 24-2.

The information distribution device 2 includes supplementary-information transferring means (not shown) that, in response to a request from the information display device 1, extracts the generated XML data and prestored advertisement data as the supplementary information and transmits that information to the information display device 1.

Advertisements to be distributed to and published on the information display device 1 are received from the FTP server 4 connected via a communication network to terminal devices (not shown) at advertising companies or the like and are saved in the database 24. At this time, when there is only image data, the information distribution device 2 performs the same process on image data for the newspaper or other publication to generate image data and text data. When the information distribution device 2 has received from a terminal device at an advertising company or the like processed data that can be directly distributed via the FTP server 4, or when the information distribution device 2 has previously acquired data that can be directly distributed, the information distribution device 2 saves this data, which can be images, text, and/or sound, as advertisement data to be displayed on the information display device 1. As shown in FIG. 6, the advertisement-data display window 13b is provided separately on the display screen 13a of the information display device 1. The advertisement data is displayed in this window.

Various types of content, including such publications as newspapers, magazines, local-interest publications, novels, and comics, can be targeted for distribution to the information display device 1 to be displayed on the display screen 13a as a page image 100. However, it is also possible to distribute and display advertisement data by incorporating a program in the application used to display the publication content for displaying separate data independently in the advertisement-data display window 13b provided on the display screen 13a of the information display device 1. Accordingly, by performing a statistical process on the access history of content that a user requests, it is possible to select types of advertisements for distribution based on a user's tastes. The statistical process for determining a user's tastes is implemented by generating in the information display device 1 access data that indicates the pages of a newspaper—as well as the types and content of novels, magazines, and/or comics—that a user has most frequently, and the location and types of nearby retail shops when local-interest publications are accessed by the user, and by then transmitting this access data to the information distribution device 2. The information distribution device 2 saves this data as access history and determines the user's tastes by analyzing this access history, which enables the selection of advertising content for distribution to the user.

As shown in FIG. 6, an advertisement-data display window 13b is provided separately on the display screen 13a of the information display device 1 for displaying advertisement data so that the advertisement data overlaps the page image 100.

As described above, not only newspapers, but a variety of content, including magazines, local-interest publications, novels, and comics, can be displayed on the display screen 13a of the information display device 1 as a page image 100. At the same time that a user's desired content is distributed, advertisement data is distributed and displayed in the advertisement-data display window 13b provided on the display screen 13a. Advertisement content relating to the content displayed on the display screen 13a can be distributed as the advertisement data. However, in the preferred embodiment, data for the same advertisement content can be distributed universally, regardless of the content displayed on the display screen 13a. Hence, the information distribution device 2 can serve as a separately provided advertisement distribution server for independently distributing advertisement data unrelated to the distribution of newspapers and other content. At this time, the information distribution device 2 can distribute advertising selected according to a user's interests in such content, as acquired through feedback from the information display device 1 on access data related to the distributed content.

The advertisement-data display window 13b is displayed on the display screen 13a through animation, much like a pull-up menu that advances upward from the bottom, for example. When displaying the advertisement-data display window 13b through animation, it is possible to have the advertisement-data display window 13b zoom in from the top, left, or right side, or from a center point, rather than from the bottom, or to zoom up from an advertisement icon displayed on the display screen. The advertisement data can be displayed in the advertisement-data display window 13b of the display screen 13a as a semitransparent image that overlaps the page image 100.

The advertisement-data display window 13b is implemented by appropriating a portion of the display memory used to display an image on the display screen 13a. Because an address pointer can be used to identify a location in the display memory, the advertisement-data display window 13b for displaying advertisement data can be specified.

Animation of the advertisement-data display window 13b can be achieved by transferring the advertisement data written in buffer memory sequentially to the address in the display memory, while moving the address pointer. Further, displaying the advertisement data as a semitransparent image can be achieved by alternating the layout of the advertisement data and the page image 100 when overlapping the page image 100 with the advertisement data; for example, by alternating each pixel of the image data for the page image 100 and the image data for the advertisement data.

The content to be displayed on the display screen 13a of the information display device 1 is not limited to the page image 100 of magazines, local-interest publications, novels, comics, and the like, but can also include video, photographs, and animation. Similarly, the present invention is not limited to a configuration for displaying advertisements in the advertisement-data display window 13b, but can be applied to a configuration for publishing still images, video, animation, and sound data in the display window, provided they are distributed universally to users. The advertisement-data display window 13b can also cover the entire display screen 13a rather than just a portion of it. Further, if a Web browser is installed on the information display device 1, the information display device 1 can be configured to connect to a sponsor's Web site after displaying the sponsor's advertisement in the advertisement-data display window 13b.

Next, access between the information display device and information distribution device will be described, with reference to FIGS. 13 and 14, for a case in which the information distribution device distributes fee-based electronic publications, such as books or magazines.

FIG. 13 illustrates the process for an initial access between the information display device and the information distribution device. FIG. 14 illustrates the process for a second or subsequent access between those devices.

During an initial access (a mode for newly purchasing an electronic publication for displaying and browsing by a user) shown in FIG. 13, a user already registered in the information distribution device 2 (not shown) displays a purchase screen for electronic publications on the display screen 13a of the information display device 1 (step S31), views a list of electronic publications available for purchase, and selects a desired publication (step S32). Through this process, the user can download a sample of the publication for browsing or can execute a procedure to purchase the publication. In the purchasing procedure, the information display device 1 transmits to the billing server 30 of the information distribution device 2 the data that is required for a purchase application (step S33). Upon receiving this data, the billing server 30 coordinates with the user-data server 29 to determine whether the user is a registered user and to verify the user's credit limit and other purchasing criteria (step S34). When determining that the publication may be purchased by that user, the billing server 30 sends a notification indicating that the purchase is approved (step S35), enabling the user to download the desired electronic publication. The process for registering a user on the information distribution device 2 will not be described here.

Upon receiving the purchase-approval notification, the information display device 1 transmits the purchase data to the user-data server 29 of the information distribution device 2 (step S36). The user-data server 29 receives this purchase data and updates the purchase data in the database 24-3 (see FIG. 1; step S37). At the same time, the information display device 1 updates the purchase data in a table that stores purchase data relating to electronic publications (step S38).

After updating the purchase data, the information display device 1 issues a request to the information distribution device 2 for page data (image data) of the electronic publication selected in step S32 (step S39) and subsequently downloads page data for the corresponding electronic publication from the database 24 (step S40). Downloading of page data for the electronic publication can be achieved automatically by embedding the download URL or the like as a link in the electronic publication listed on the selecting and purchasing screen in step S32. Alternatively, the billing server 30 can notify the information display device 1 of the download link.

The information display device 1 saves, in the RAM or flash memory (cache) of the storing means 12, the image data downloaded for the electronic publication, and displays the page data on the display screen 13a (step S41).

The process for second and subsequent accesses (a mode by which a user can display and browse purchased electronic publications) is illustrated in FIG. 14. However, descriptions of steps similar to those in the process shown in FIG. 13 will be abbreviated or not included herein. During the mode for displaying and browsing already purchased electronic publications, the user displays a Bookshelf screen that has publications previously purchased by that user, browses a list of electronic publications that can be purchased, and selects a desired publication from the list (step S52). The information display device 1 then transmits, to the billing server 30 of the information distribution device 2, information for a request to confirm that the electronic publication has been purchased (step S53). The billing server 30 performs a purchase verification (step S54). Upon confirming that the publication has been purchased, the billing server 30 transmits this purchase-approval confirmation to the information display device 1 as a notification (step S55).

Upon receiving a notification that an electronic publication has been purchased, the information display device 1 transmits, to the user-data server 29 of the information distribution device 2, purchase data indicating this publication has been purchased (step S56). The user-data server 29 receives this purchase data and updates the purchase data in the database 24-3 (see FIG. 1; step S57). At the same time, the information display device 1 updates the purchase data in a table (not shown) for saving purchase data relating to electronic publications (step S58).

After updating the purchase data, the information display device 1 checks the cache in the storing means. If any image data remains in the cache, the information display device 1 displays this local image data. But if no image data remains in the cache, the information display device 1 issues a request to the information distribution device 2 for the relevant page data and downloads the page data from the database 24 (steps S59, S60, and S61). The information display device 1 saves the page data in the cache of the storing means 12 and displays the page data on the display screen 13a (step S62).

The present invention's information display device can be applied not only to a mobile telephone, smartphone, PC, game console, or television, but also to a multifunction device such as a multifunction printer that combines functions for coping, printing, scanning, faxing, and the like. Further, the portable information-display device can be a dedicated terminal, or a mobile PC, smartphone, PDA, or portable music player having application software installed thereon.

The present invention is not limited to the preferred embodiments described above. Many modifications and variations can be made thereto without departing from the spirit of the invention, the scope of which is defined by the attached claims.

EXPLANATION OF NUMBERS IN THE DRAWINGS 1 portable information-display device, information display device
1b information display device (PC)
2 information distribution device
4 FTP server
5 management server
6 internet
7 portable telephone communication network
8 access point
11 controlling means
12 storing means
13 displaying means
13a display screen
13b advertisement-data display window
14 image processing means
15 communication means
16 inputting means
16a operating buttons
17 external input/output means
18 card interface unit
19 memory card
21 central control unit
21a processing program
22 input device
23 display unit
24, 24-1, 24-2, 24-3 database
24a storage device
25 image-data generating means
25a image acquisition means
25b image compression means
26 attribute-data assigning means
27 XML-data generating means
28 Web server
28a image-data transmitting means
29 user-data server
30 billing server
100 page image

The invention claimed is:

1. An information display device for receiving image data of publications distributed by an information distribution device via a communication network and for displaying said image data as page images on a display screen, with said information display device including at least:
   storing means for storing various data and programs used to execute applications;
   controlling means for controlling data processes, input/output devices, and the execution of programs stored in the storing means;
   communication means for receiving image data and associated attribute data via the communication network;
   inputting means for receiving event input generated by various operations on keyboard, a pointing device, or a touch panel; and
   displaying means for displaying the image data and attribute data on a display screen in response to operations received by the inputting means;
   and wherein said information display device the image data includes multiple sets of image data in a hierarchical structure having multiple hierarchical levels differing in image size and resolution; and said storing means has image-processing means for selecting corresponding image data of a corresponding hierarchical level in response to operations for enlarging, reducing, or moving a display image received by the inputting means, so as to display all or a portion of an image equivalent to a page image; and,
   when establishing an HTTP connection with the information distribution device via the communication means, transmitting search data based on event input received by the inputting means, receiving XML data describing addresses and display positions of the corresponding image data and attribute data, receiving the relevant image data and attribute data based on the XML data, and displaying the image data and attribute data on the display screen via the displaying means;
   the controlling means has prefetching means for storing image data associated with page changes from among the received image data constituting each page of the image data to be displayed on the display screen in a display region of the storing means based on a predetermined priority; and
   in the event of a user operation for changing to a page that does not conform to the predetermined priority before reading of the specified page has been completed, the controlling means first reads the image data for the specified page and subsequently reads the image data for other pages, based on a predetermined priority that differs according to content.

2. An information display device according to claim 1, but wherein the multiple sets of image data for multiple hierarchical levels of differing image size and differing resolution correspond to each of multiple pages in the publication, and the controlling means downloads all of the multiple sets of image data for the multiple pages from the information distribution device via the communication means.

3. An information display device according to claim 2, but wherein, when downloading the multiple sets of image data for the multiple hierarchical levels having different image sizes and resolutions for multiple pages from the information distribution device, the communication means does not download image data of the hierarchical level having a high resolution when the reception speed for the image data is less than a prescribed value.

4. An information display device according to claim 1, but wherein the displaying means has a single-page mode for displaying one page of the image data on the display screen and a double-page mode for displaying two pages of the image data on the display screen; and
   when shifting from the single-page mode to the double-page mode, where the front cover is page 1 and the currently displayed page is page X,
   the displaying means combines and displays image data for page X, which was previously displayed in the single-page mode, on the left side and image data for page X+1 on the right side when the image data is printed on the right side and X is odd or when the image data is printed on the left side and X is even; and
   the displaying means combines and displays image data for page X, which was previously displayed in the single-page mode, on the right side and image data for page X+1 on the left side when the image data is printed on the right side and X is even or when the image data is printed on the left side and X is odd.

5. An information display device according to claim 1, but wherein the displaying means has a memo function for adding and displaying new image data or text in combination with the image data constituting each page of image data to be displayed on the display screen and for saving this new image data or text in the storing means so that the data can be redisplayed.

6. An information display device according to claim 1, but wherein the displaying means provides a separate information display window on the display screen used to display the image data, and displays in the information display window separate and independent content transmitted from the information distribution device or another server.

7. An information display device according to claim 6, but wherein the separately provided information display window advances outward from one side of the display screen through animation.

8. An information display device according to claim 6, but wherein the information displayed in the separately provided information display window is displayed as a semitransparent image that overlaps the displayed image corresponding to the image data.

* * * * *